(12) United States Patent
Kang (10) Patent No.: US 9,035,496 B2
(45) Date of Patent: May 19, 2015

(54) POWER CONTROL SYSTEM AND CONTROLLING METHOD THEREOF

(75) Inventor: Jin-Wook Kang, Yongin-si (KR)

(73) Assignee: SAMSUNG SDI CO., LTD., Yongin-si, Gyeonggi-do (KR)

(*) Notice: Subject to any disclaimer, the term of this patent is extended or adjusted under 35 U.S.C. 154(b) by 911 days.

(21) Appl. No.: 13/236,805

(22) Filed: Sep. 20, 2011

(65) Prior Publication Data

US 2012/0261997 A1 Oct. 18, 2012

(30) Foreign Application Priority Data

Apr. 18, 2011 (KR) .................. 10-2011-0035831

(51) Int. Cl.
*H02J 7/00* (2006.01)
*H02J 1/10* (2006.01)

(52) U.S. Cl.
CPC *H02J 1/10* (2013.01); *H02J 7/0013* (2013.01)

(58) Field of Classification Search
CPC ...... H02J 7/0024; H02J 7/0014; H02J 7/0016
USPC .............. 307/71; 320/117, 119, 120
See application file for complete search history.

(56) References Cited

U.S. PATENT DOCUMENTS

| | | | | |
|---|---|---|---|---|
| 3,286,152 A * | 11/1966 | Noe | .............................. | 320/117 |
| 6,028,415 A * | 2/2000 | Nagai et al. | .................... | 320/162 |
| 6,326,768 B2 * | 12/2001 | Nagai et al. | .................... | 320/116 |
| 7,193,390 B2 * | 3/2007 | Nagai et al. | .................... | 320/116 |
| 2009/0236917 A1 | 9/2009 | Bettenwort et al. | | |
| 2010/0171503 A1 | 7/2010 | Fredette | | |

FOREIGN PATENT DOCUMENTS

| | | | |
|---|---|---|---|
| JP | 04248332 A | * | 9/1992 |
| JP | 05030664 A | * | 2/1993 |
| KR | 10-2005-0020361 A | | 3/2005 |
| KR | 10-2005-0034441 A | | 4/2005 |
| KR | 10 2009-0014897 A | | 2/2009 |
| KR | 10-2008-0030129 A | | 4/2009 |
| KR | 10-2009-0101338 A | | 9/2009 |
| KR | 10 2010-0072237 A | | 6/2010 |

OTHER PUBLICATIONS

Machine translation for JP05030664A.*
Korean Office Action in KR 10-2011-0035831, dated Oct. 31, 2012 (Kang).

* cited by examiner

*Primary Examiner* — Fritz M Fleming
(74) *Attorney, Agent, or Firm* — Lee & Morse, P.C.

(57) ABSTRACT

A power control system includes a rechargeable battery, the rechargeable battery including a first battery unit and including a second battery unit connected to a first terminal of the first battery unit at a first node, a switching unit, the switching unit including a first switch connected to a second terminal of the first battery unit and including a second switch connected to the first node, and a control unit, the control unit being configured to generate and transmit switch control signals respectively corresponding to the first switch and the second switch, and being configured to control a voltage of the rechargeable battery such that the voltage is maintained in a threshold range of a predetermined rated voltage.

18 Claims, 4 Drawing Sheets

POWER CONTROL SYSTEM AND CONTROLLING METHOD THEREOF

BACKGROUND

1. Field

Embodiments relate to a power control system and a power control method.

2. Description of the Related Art

Recently, interest in renewable energy has been increasing over the entire world due to an energy shortage and environmental problems relating to energy generation. Renewable energy sources include those such as wind power, sunlight, water power, geothermal power, etc., such energy sources typically being converted into electrical energy.

The electrical energy may be transmitted to a load through a power converting circuit. However, some renewable energy sources may exhibit a change of output power, i.e., power variability, due to, e.g., changes in solar power with time of day or cloud cover. A technique for reducing the change of output power includes using a rechargeable battery. For example, when a generation amount of the renewable energy is large, electricity may be charged in the rechargeable battery, and, when a generation amount is low, or when a consumption amount is large, the electricity may be discharged from the rechargeable battery.

The above information disclosed in this Background section is only for enhancement of understanding of the background of the invention and therefore it may contain information that does not form the prior art that is already known in this country to a person of skill in the art.

SUMMARY

An embodiment is directed to a power control system, including a rechargeable battery, the rechargeable battery including a first battery unit and including a second battery unit connected to a first terminal of the first battery unit at a first node, a switching unit, the switching unit including a first switch connected to a second terminal of the first battery unit and including a second switch connected to the first node, and a control unit, the control unit being configured to generate and transmit switch control signals respectively corresponding to the first switch and the second switch, and being configured to control a voltage of the rechargeable battery such that the voltage is maintained in a threshold range of a predetermined rated voltage.

The power control system may further include a power converting unit having a voltage conversion ratio determined according to an ON/OFF state of the first switch and the second switch.

The power control system may further include a first link unit, the first link unit being connected to the first switch and the second switch.

The first link unit may be a DC link capacitor.

The power control system may further include a second link unit, the second link unit being connected to a terminal, which is not connected to the first node, among terminals of the first switch and the second battery unit.

The switching unit may further include a third switch, the third switch being connected to a terminal, which is not connected to the first node, of the second battery unit.

The power control system may further include a third link unit, the third link unit being connected to the second switch and the third switch of the switching unit.

The predetermined rated voltage may be previously set up according to a power control mode in the control unit.

The power control mode may include a first power control mode in which the first battery unit and the second battery unit of the rechargeable battery are separately operated, and include a second power control mode in which the first battery unit and the second battery unit are operated together, the first switch and the second switch, connected to respective terminals of the first battery unit, may be turned on in the first power control mode, and the second switch may be turned off in the second power control mode.

Each charge and discharge operation of one of the first battery unit and the second battery unit may be activated in the first power control mode, and the charge and discharge operation of the first battery unit and the second battery unit may be activated in the second power control mode.

The first switch and the second switch may be mechanical switches or semiconductor switches.

The control unit may include a voltage setting unit configured to set up the predetermined rated voltage, a first control unit configured to confirm a total voltage of the rechargeable battery and generate the switch control signal controlling an ON duty ratio for the voltage of the rechargeable battery to be maintained in the threshold range of the rated voltage, a second control unit configured to confirm each voltage of the first battery unit and the second battery unit, and transmit the voltage to the first control unit, and a communicator configured to transmit voltage information or the switch control signal between the first control unit and the second control unit and the outside.

The first control unit may control the ON duty ratio of the switch control signal to control the charge for the battery unit having a low voltage when the transmitted voltage difference between the first battery unit and the second battery unit is more than a predetermined voltage.

The second control unit may generate the switch control signal controlling the ON duty ratio for the first battery unit and the second battery unit to maintain the voltage within the threshold range for $1/2$ of the rated voltage when the first control unit is not operated.

The power control system may further include a sensing unit, the sensing unit including voltage sensors respectively connected to the first battery unit and the second battery unit to sense a corresponding voltage at a real time or predetermined frequency, the sensing unit being configured to transmit the sensed voltage of the first battery unit and the second battery unit to the control unit.

The rechargeable battery may include a plurality of lithium ion battery cells.

Voltages of the first battery unit and the second battery unit may be the same.

Another embodiment is directed to a power control method, including setting up a power control mode, the power control mode adjusting an operation state for a first battery unit and a second battery unit, the first battery unit and the second battery unit being included in a rechargeable battery, the second battery unit being connected to a first terminal of the first battery unit at a first node, setting up each rated voltage of the first battery unit and the second battery unit or an entire rated voltage of the rechargeable battery according to the power control mode, generating switch control signals, the switch control signals controlling a first switch connected to a second terminal of the first battery unit and controlling a second switch connected to the first node according to the power control mode, and controlling an ON/OFF state of the first switch and the second switch in response to the switch control signals, and charging or discharging the first battery unit and the second battery unit simultaneously or at different times.

An ON duty ratio of the switch control signals may be controlled for each voltage of the first battery unit and the second battery unit, or the entire voltage of the rechargeable battery, to be maintained within the threshold range of the rated voltage.

Each voltage of the first battery unit and the second battery unit may be the same.

The power control mode may include a first power control mode in which the first battery unit and the second battery unit are separately operated, and include a second power control mode in which the first battery unit and the second battery unit are operated together.

The power control method may further include, before the charge or discharge of the first battery unit and the second battery unit, adjusting a voltage difference between the first battery unit and the second battery unit within a predetermined voltage range.

The adjusting may include measuring each voltage of the first battery unit and the second battery unit, and comparing the voltages of the first battery unit and the second battery unit to determine a voltage difference, and controlling the ON duty ratio of the switch control signals transmitted to the switch connected to both terminals of the battery unit to control the charge of the battery unit having a low voltage when the voltage difference is more than a predetermined voltage.

BRIEF DESCRIPTION OF THE DRAWINGS

The above and other features and advantages will become more apparent to those of skill in the art by describing in detail example embodiments with reference to the attached drawings, in which.

DETAILED DESCRIPTION

Korean Patent Application No. 10-2011-0035831, filed on Apr. 18, 2011, in the Korean Intellectual Property Office, and entitled: "Power Control System and Controlling Method Thereof," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. Like reference numerals refer to like elements throughout.

A first example embodiment will be representatively described, and therefore only components other than those of the first example embodiment may be described in other example embodiments. The drawings and description are to be regarded as illustrative in nature and not restrictive.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Figure 1:
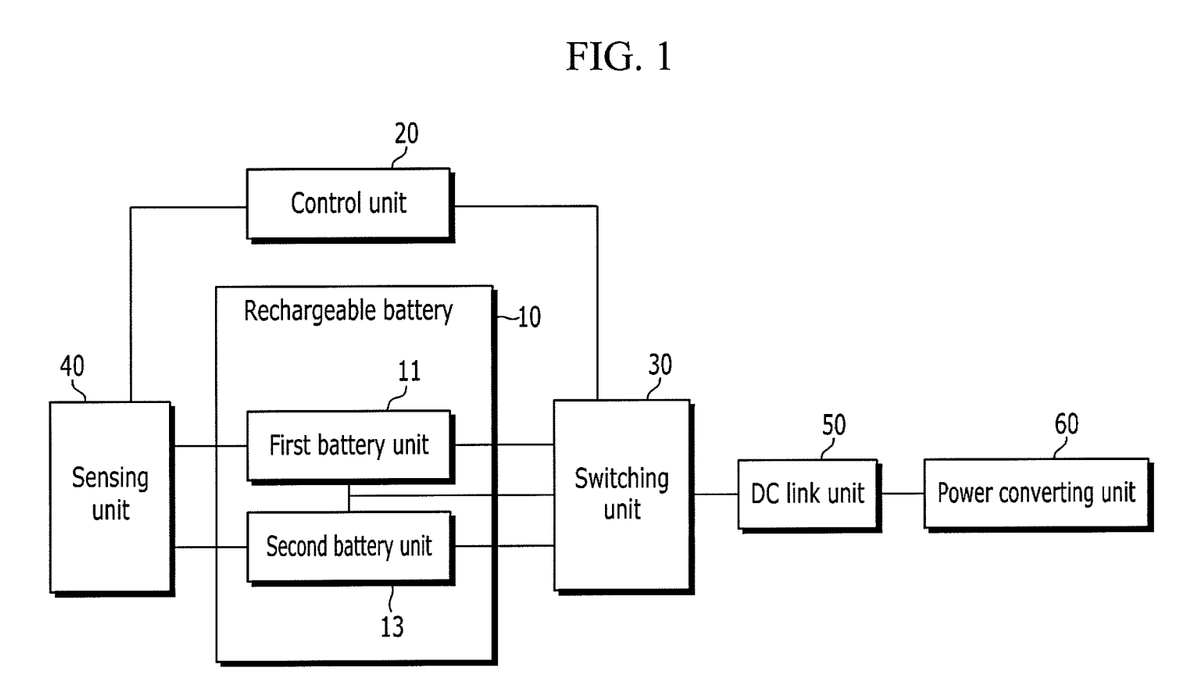
FIG. 1 illustrates a block diagram of a power control system according to an example embodiment.

FIG. 1 illustrates a block diagram of a power control system according to an example embodiment. The power control system according to an example embodiment may be applied to a rechargeable battery. The rechargeable battery may be an assembly of a plurality of rechargeable battery cells that can be repeatedly charged and discharged.

Referring to FIG. 1, a power control system 100 according to an example embodiment may include a rechargeable battery 10, a control unit 20, and a switching unit 30.

The rechargeable battery 10 may be connected to an external power supplying source, such as a generator, and/or an external load, through a DC link unit 50 and a power converting unit 60 to frequently repeat charging and/or the discharging corresponding to a switching operation of the switching unit 30. In another implementation, multiple DC link units, e.g., two or three DC link units, may be used.

The power control system 100 according to another example embodiment may further include a sensing unit 40, the sensing unit 40 measuring a voltage for a region or regions of the rechargeable battery 10. The sensing unit 40 may be used in voltage balancing.

Details of constitutions and functions of the power control system 100 according to the present example embodiment will now be described with reference to a circuit diagram of FIG. 2.

Figure 2:
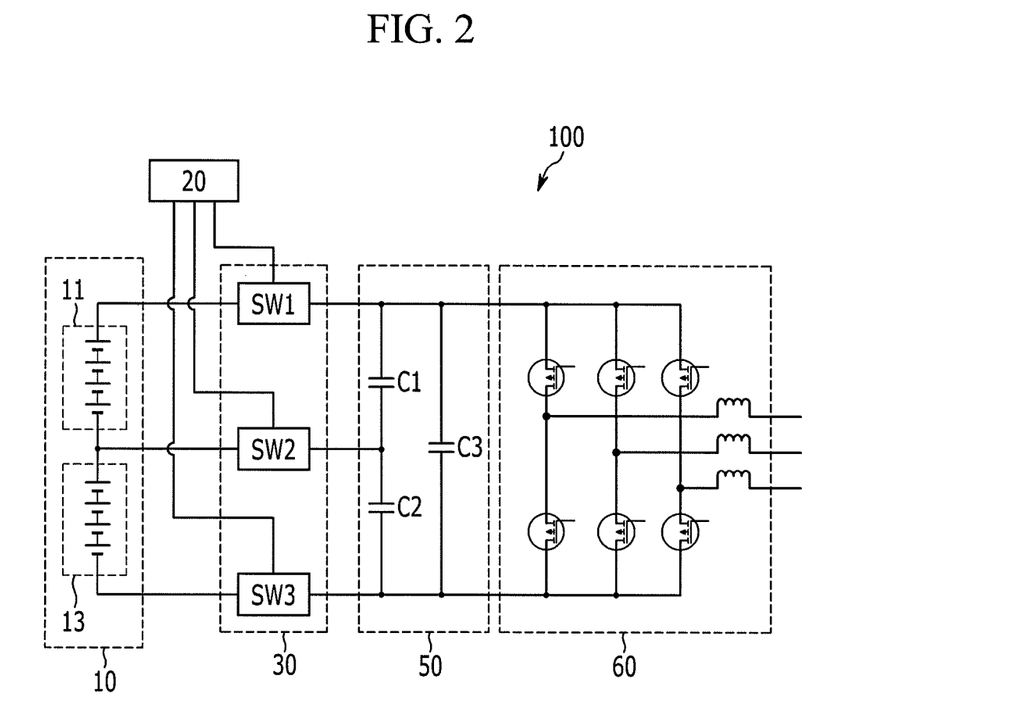
FIG. 2 illustrates a circuit diagram of a power control system according to an example embodiment.

Referring to FIG. 2, the rechargeable battery 10 may include a first battery unit 11 and a second battery unit 13. The first battery unit 11 and the second battery unit 13 may respectively include a plurality of rechargeable battery cells that are coupled in, e.g., series. The rechargeable battery 10 may use a lithium ion battery or another type of battery.

The voltages of the first battery unit 11 and the second battery unit 13 are preferably the same, i.e., numerically equal, or are in the same range. For example, the first battery unit 11 and the second battery unit 13 may include rechargeable battery cells having the same voltage capacity, and may include the same number of rechargeable battery cells.

A plurality of rechargeable battery cells may be coupled in series in a stack structure, thereby forming one string, and the first battery unit 11 and the second battery unit 13 may respectively include a plurality of strings. In an example embodiment, the first battery unit 11 and the second battery unit 13 have the same voltage within a predetermined error range. The number of rechargeable battery cells included in the first battery unit 11 and the second battery unit 13 may be the same, and the number of strings of rechargeable battery cells may be the same, and the total voltage amount of the first battery unit 11 and the second battery unit 12 is preferably the same.

Separately operating the first battery unit 11 and the second battery unit 13 may be defined as a half string mode. Operating the first battery unit 11 and the second battery unit 13 together may be defined as a full string mode in which the entire rechargeable battery 10 is driven.

A switch may be provided at both terminals of the first battery unit 11 and the second battery unit 13 of the rechargeable battery 10. For example, in the example embodiment shown in FIG. 2, a first switch SW1 is connected to a second terminal of the first battery unit 11. A second switch SW2 is connected to a terminal or node that is common to a first terminal of the first battery unit 11 and a first terminal of the second battery unit 13. A third switch SW3 is connected to a second terminal of the second battery unit 13.

The first switch SW1, the second switch SW2, and the third switch SW3 may be DC contact switches, and may be included in the switching unit 30. The switches of the switching unit 30 may be mechanical switches. However, they are preferably semiconductor switches that are operated in response to a switching control signal transmitted from the control unit 20.

The control unit 20 may generate and transmit a first switching control signal, a second switching control signal, and a third switching control signal respectively controlling switching ON/OFF states of each of the first switch SW1, the second switch SW2, and the third switch SW3.

The control unit 20 may set up a power control mode. The control unit 20 may control the first switching control signal, the second switching control signal, and the third switching control signal according to the power control mode.

In an example embodiment, the power control mode includes the half string mode (only electrically driving the first battery unit 11 or the second battery unit 13 for the charge or the discharge) and the full string mode (electrically driving both the first battery unit 11 and the second battery unit 13 for the charge or the discharge).

In the half string mode, the control unit 20 may generate the first switching control signal and the second switching control signal, and transmit them to the switching unit 30 such that the first switch SW1 and the second switch SW2 may be turned on, while the remaining switch SW3 may be turned off. In another implementation, the control unit 20 may generate the second switching control signal and the third switching control signal, and transmit them to the switching unit 30 to turn on the second switch SW2 and the third switch SW3, while the remaining switch SW1 may be turned off.

Thus, in the rechargeable battery 10, the first battery unit 11 or the second battery unit 13 may be electrically connected to the DC link unit 50 such that the power is charged or discharged through an external power generator or an external load.

Meanwhile, in the full string mode, the control unit 20 may generate the first switching control signal and the third switching control signal, and transmit them to the switching unit 30 to turn on the first switch SW1 and the third switch SW3, respectively, while the second switching control signal is transmitted as the switching off signal such that the second switch SW2 is turned off. Thus, the first battery unit 11 and the second battery unit 13 of the rechargeable battery 10 may both be electrically connected to each other, and thereby the rechargeable battery 10 may execute the charge and discharge with the outside through the DC link unit 50.

The DC link unit 50 connected with each battery unit of the rechargeable battery 10 may maintain the voltage level of each of the battery unit or the rechargeable battery 10 as a constant DC link voltage level. The DC link unit 50 may include a DC link capacitor coupled in parallel between each battery unit of the rechargeable battery 10 and the power converting unit 60. As the DC link capacitor, an aluminum electrolytic capacitor, a high voltage polymer capacitor, or a high voltage and large current multi-layer ceramic capacitor may be used.

DC link capacitors of a predetermined number may be provided according to the power control mode. In the example embodiment shown in FIG. 2, the DC link unit 50 includes a first capacitor C1 and a second capacitor C2 maintaining the voltages of both terminals of the first battery unit 11 and the second battery unit 13 according to the half string mode. Both terminals of the first battery unit 11 are connected to respective electrodes of the first capacitor C1, and both terminals of the second battery unit 13 are connected to respective electrodes of the second capacitor C2. Also, the DC link unit 50 includes the third capacitor C3 maintaining the entire voltage of the first battery unit 11 and the second battery unit 13 according to the full string mode. One electrode of the third capacitor C3 is connected to one terminal of the first battery unit 11, and another electrode of the third capacitor C3 is connected to one terminal of the second battery unit 13 (not the common terminal).

The DC link unit 50 may prevent the voltage level from being unstable due to, e.g., a change of the output voltage of the external power generator, a momentary voltage drop of a common system, or a maximum load generation of an external load. Thus, the power converting unit 60 may be normally operated.

The power converting unit 60 may be connected to the DC link unit 50 to convert the power applied to the DC link unit 50 and the power transmitted to the DC link unit 50. The power converting unit 60 may include, e.g., a bi-directional inverter and converter converting between the DC power and the AC power. The bi-directional inverter and converter may be single-phase or three-phase. The power converting unit 60 in the example embodiment shown in the circuit diagram of FIG. 2 uses a common three-phase inverter.

The power converting unit 60 of FIG. 2 may convert three-phase AC power, transmitted from an external power generator, into DC power (in the case of charging), and the DC power may be charged to each battery unit of the rechargeable battery 10 through the DC link unit 50. In the case of a discharge, in the state that the DC voltage generated by the charges charged in each battery unit of the rechargeable battery 10 is maintained as the DC link voltage level through the DC link unit 50, the DC voltage may be transmitted to the power converting unit 60 and may be converted into the three-phase AC power. Thus, the AC power may be transmitted to the external common system or the load, where the power may be consumed.

In an implementation, charging may be performed with the power control mode in the half string mode, with the first battery unit 11 or the second battery unit 13 being separately driven. In this case, the DC power converted from the power converting unit 60 may be transmitted and charged as the predetermined DC voltage level through the first capacitor C1 or the second capacitor C2 of the DC link unit 50.

In another implementation, charging may be performed with the power control mode in the full string mode, with the first battery unit 11 and the second battery unit 13 both being driven. In this case, the DC power converted from the power converting unit 60 may be transmitted and charged as the predetermined DC voltage level through the third capacitor C3 of the DC link unit 50.

In another implementation, discharging may be performed with the power control mode in the half string mode, with the first battery unit 11 or the second battery unit 13 transmitting the DC voltage that is separately charged to the power converting unit 60 through the first capacitor C1 or the second capacitor C2 of the DC link unit 50. In this case, the power converting unit 60 may convert the DC power of the battery unit into the AC power and transmit it to the outside.

In another implementation, discharging may be performed with the power control mode in the full string mode, with the rechargeable battery 10 maintaining the DC voltage that is wholly charged through the third capacitor C3 of the DC link unit 50 and transmitting it to the power converting unit 60. In this case, the power converting unit 60 may convert it into the AC power and transmit the AC power to the outside.

As described above, the power control system according to the present embodiment may control the operation of each battery unit of the rechargeable battery 10 in response to the switching control signal transmitted from the control unit 20. Thus, energy transfer may be frequently controlled according to the charge and discharge design by maintaining the voltage that is charged and discharged corresponding to the power control mode or converting the power. Accordingly, the energy efficiency may be improved, and the power that is charged and discharged may be frequently used such that an economic power usage system may be built.

Figure 3:
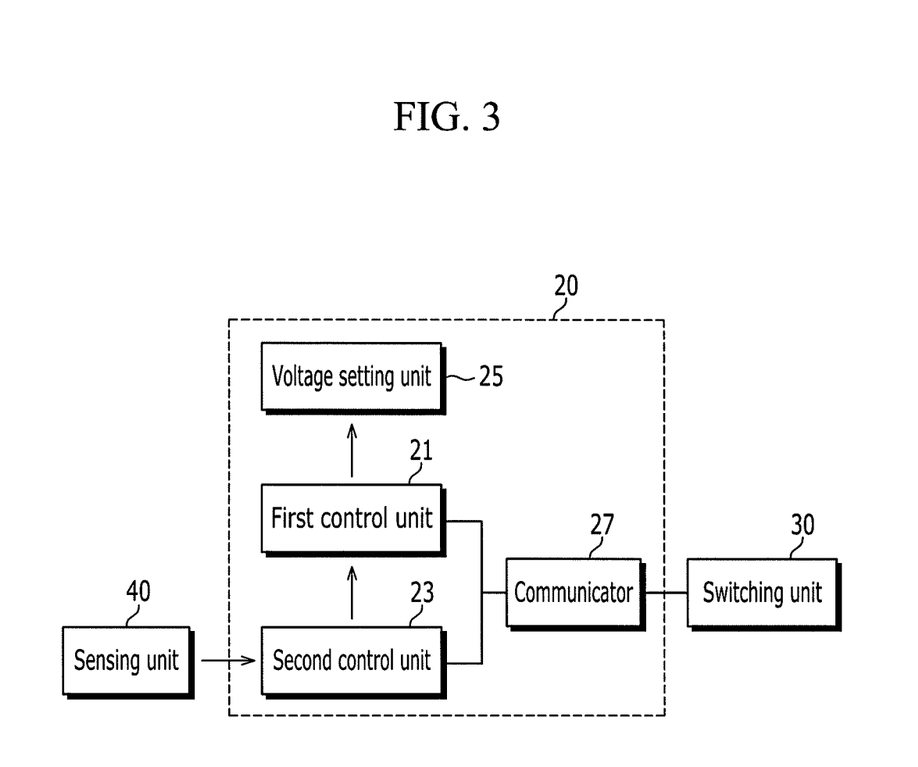
FIG. 3 illustrates a block diagram of a control unit 20 of the power control system shown in FIG. 1.

FIG. 3 illustrates a block diagram showing details of an example of the control unit 20 of the power control system shown in the example embodiment of FIG. 1 and FIG. 2.

A function of the control unit 20 in the power control system of the present embodiment will be described in detail with reference to the block diagram of FIG. 3.

The control unit 20 may include a first control unit 21 executing power charge and discharge control of the rechargeable battery 10, a second control unit 23 executing power charge and discharge control of the lower battery unit of the rechargeable battery 10, a communicator 27 transmitting information or signals between the first control unit 21, the second control unit 23, and other constituent elements, and a voltage setting unit 25 setting a rated voltage of the battery unit or the rechargeable battery according to the power control mode.

The voltage setting unit 25 may set the rated voltage of the entire rechargeable battery 10 or the rated voltage of the battery units forming the rechargeable battery 10, that is, the first battery unit 11 or the second battery unit 13, according to the half string mode or the full string mode. In FIG. 3, the voltage setting unit 25 is separately provided, however the above constitutions may be embedded, e.g., so as to set up the rated voltage in the first control unit 21 or the second control unit 23.

The first control unit 21 may correspond to a master control unit controlling the entire charge and discharge of the power control system of the present embodiment, and the second control unit 23 may be a slave control unit corresponding to a sub-control unit of the master control unit.

For example, the first control unit 21 may confirm the voltage level of the rechargeable battery 10 and control the charge and discharge of the rechargeable battery 10, such that the rechargeable battery 10 maintains the same voltage within the error range of the predetermined rated voltage in the voltage setting unit 25. The charge and discharge of the rechargeable battery 10 may control and adjust an ON duty ratio of a plurality of switching control signals transmitted to the switching unit 30.

The voltage level of the rechargeable battery 10 may be confirmed by sensing the voltage of both terminals of the rechargeable battery 10. The power control system of the present embodiment may include a sensing unit 40 measuring the voltage of the rechargeable battery 10.

The sensing unit 40 may include a plurality of voltage sensors, and may transmit the voltage of the rechargeable battery 10 in real time from the voltage sensors to the control unit 20.

In FIG. 3, the measuring voltage of the sensing unit 40 is shown as being transmitted to the second control unit 23 (in another implementation, the measuring voltage may be transmitted to the first control unit 21). The measuring voltage of the sensing unit 40 transmitted to the second control unit 23 may be used to sense each voltage of the battery unit of the rechargeable battery 10 in the sensing unit 40. The voltage of the battery unit may be transmitted to the slave control unit.

For example, in a case of controlling the charge and discharge according to the half string mode, the voltage of each battery unit may be measured in the sensing unit 40, and the measured voltage may be transmitted to the second control unit 23 as the slave control unit. Thus, the output voltage of the battery unit may be confirmed and collected in the second control unit 23, and may be transmitted to the first control unit 21 acting as the master control unit. The first control unit 21 may obtain the output voltages of the battery units to calculate the difference voltage and execute balancing when the difference voltage deviates by a threshold range of a voltage balance as an imbalance.

The balancing for compensating a voltage imbalance between the battery units may be executed before the normal charge and discharge of the power control system. The threshold range may be set up according to circumstances, but it is preferable that the threshold range be controlled for the difference voltage to be maintained within 3% of the charge voltage.

In an implementation, the balancing compensates the voltage imbalance between the battery units. In another implementation, the balancing may be executed by sensing the voltage for each string.

A voltage balancing region may be different from a charge and discharge control region in the rechargeable battery 10. For example, when executing the balancing before starting the charge and discharge of the rechargeable battery 10, the voltage for each string of rechargeable battery 10 may be sensed and adjusted, while the next charge and discharge may be executed and controlled for each battery unit, or the entire battery unit, including a plurality of strings.

The balancing process may include transmitting the switching control signal electrically driving the battery unit of a low voltage (i.e., that is not at the balance voltage) in the first control unit 21. The battery unit of the low voltage may be operated and charged, according to the switching control signal, so as to increase the low voltage and thereby realize the voltage balance.

The communicator 27 shown in FIG. 3 may transmit and receive the information or the signals between the control unit 20 and an external device, and particularly, transmit the switching control signal generated from the first control unit 21 and the second control unit 23 to the rechargeable battery 10. Also, measured real time voltage data of the rechargeable battery 10 may be obtained from the sensing unit 40 and may be transmitted to the second control unit 23.

If desired, the second control unit 23 of the present embodiment may perform the function of the first control unit 21 when the first control unit 21 is not operated, i.e., it may replace a generation function of a switch control signal that the first control unit 21 executes. For example, the first control unit 21 may be controlled for each rated voltage of the first battery unit 11 and the second battery unit 13 to be maintained in the half string mode, and, when the first control unit 21 is not operated, the second control unit 23 may control the voltage maintenance of each battery unit. In detail, each output voltage of the first battery unit 11 and the second battery unit 13 should be controlled as the rated voltage corresponding to half of the rated voltage of the entire rechargeable battery 10, and the ON duty ratio of the switching control signal may be controlled for the battery unit voltage to be maintained in the second control unit 23.

Figure 4:
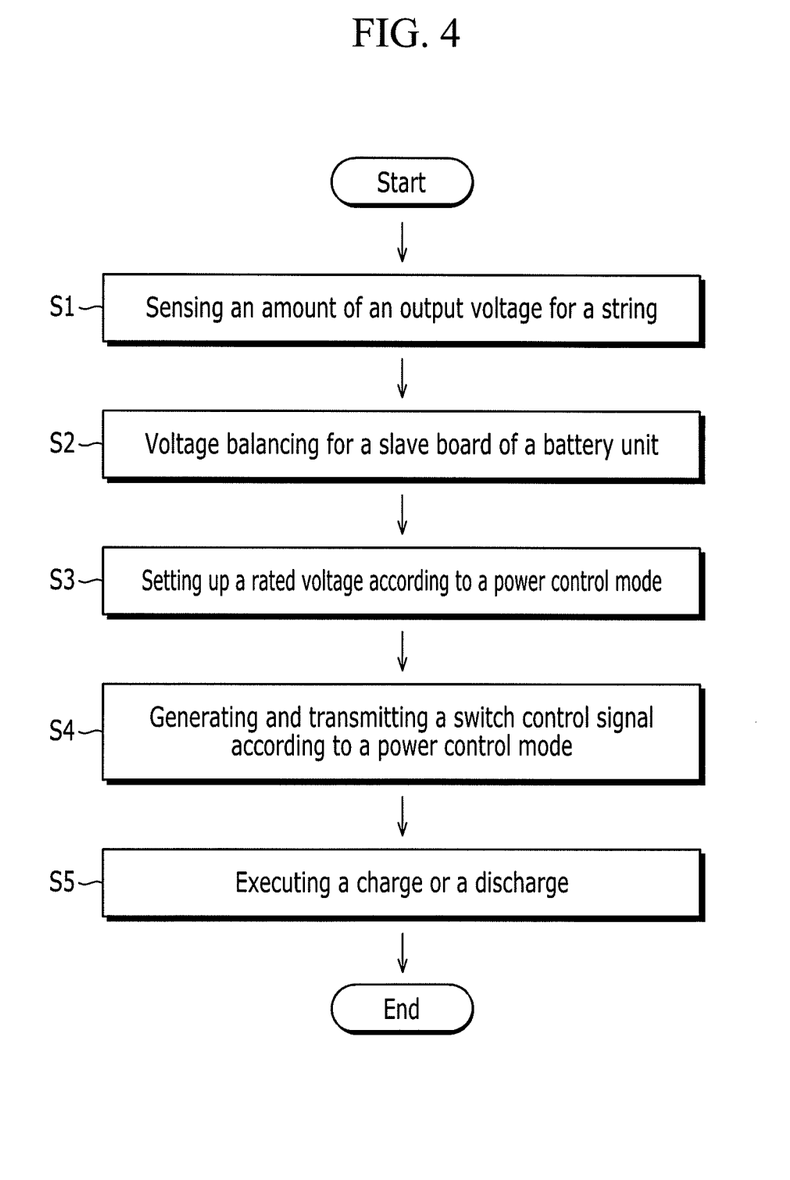
FIG. 4 illustrates a flowchart of a power control method according to an example embodiment.

FIG. 4 illustrates a flowchart of a power control method according to an example embodiment.

The power control method of FIG. 4 is similar to the process of the above described power control system, and thus some details may be omitted so as to avoid repetition.

The power control method according to the example embodiment of FIG. 4 relates to a method of executing the balancing for each string before the executing of the normal charge and discharge operation. If desired, the balancing may be executed for a battery unit including a plurality of strings.

In the example embodiment shown in the flowchart of FIG. 4, the output voltage may first be sensed for each string (S1).

The output voltage may be collected in the control unit 20 to execute the voltage balancing (S2). Here, the balancing process may be executed for the slave board of the battery unit including a plurality of strings.

Next, the charge and discharge may be substantially executed in the power control system, and the power control mode of the rechargeable battery 10 including the first battery unit 11 and the second battery unit 13 (made of a plurality of rechargeable battery cells) is set up in the control unit 20. The power control mode may be divided into the half string mode (separately controlling the first battery unit 11 and the second battery unit 13) and the full string mode (controlling the first battery unit 11 and the second battery unit 13 together).

Each rated voltage of the first battery unit 11 and the second battery unit 13, or the entire rated voltage of the rechargeable battery 10, may be set up according to the predetermined power control mode in the control unit 20 (S3).

Switching control signals (controlling a plurality of switches connected to the first battery unit 11 and the second battery unit 13) may be generated for the first battery unit 11 and the second battery unit 13 to be operated separately or together according to the power control mode (S4). Switching control signals may be transmitted to the switching unit 30 for switching the operation of the rechargeable battery 10 through the communicator 27 of the control unit 20.

Switches may be switched in response to a plurality of transmitted switching control signals. Thus, the first battery unit 11 and the second battery unit 13 of the rechargeable battery 10 may be charged or discharged simultaneously or at different times (S5). To be simultaneously charged and discharged is in accordance with the full string mode. To be separately charged and discharged is in accordance with the half string mode. The half string mode may vary the power usage of the charge and discharge, such that the half string mode may be advantageous in terms of energy efficiency.

By way of summation and review, a cycle-life of a rechargeable battery may be damaged by frequent charge and discharge thereof. Accordingly, a control circuit for efficiently controlling the charge and discharge may be used. As described above, embodiments relate to a power control system controlling charge and/or discharge, and a power control method. The power control system may include a control circuit efficiently controlling charge and discharge.

According to embodiments, the power supply device controlling a frequent charge (using the power supplied from the electric generator system) and a frequent discharge (to supply the power to a common system or the load) is provided, thereby stockpiling and saving energy by using power without wasted energy. Using the power control method according to an embodiment, cell balancing collecting the voltage imbalance for a solar cell may be executed before the energy charge such that the normal charge or discharge for the cell may be simultaneously started, and thereby stable power usage may be controlled. Before a charge or a discharge, an amount of an output voltage of a string (which includes a plurality of rechargeable battery cells) may be determined, such that the voltage balancing may be executed according to the string of the rechargeable battery, or the first battery unit and the second battery unit.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. In addition, some of the components described in the specification may be omitted without deterioration of the performance or added in order to improve the performance by those skilled in the art. Moreover, the sequence of the steps of the method described in the specification may be changed depending on a process environment or equipment by those skilled in the art. Accordingly, it will be understood by those of skill in the art that various changes in form and details may be made without departing from the spirit and scope of the present invention as set forth in the following claims.

What is claimed is:

1. A power control system, comprising:
a rechargeable battery, the rechargeable battery including a first battery unit and a second battery unit, wherein a first terminal of the second battery unit is connected to a first terminal of the first battery unit at a first node;
a DC link unit, the DC link unit including a first link unit and a second link unit, wherein a first terminal of the second link unit is connected to a first terminal of the first link unit at a second node;
a switching unit, the switching unit including a first switch connected between a second terminal of the first battery unit and a second terminal of the first link unit, a second switch connected between the first node and the second node, and a third switch connected between a second terminal of the second battery unit and a second terminal of the second link unit; and
a control unit, the control unit to generate and transmit switch control signals respectively corresponding to the first switch, the second switch, and the third switch, and to control a voltage of the rechargeable battery such that the voltage is maintained in a threshold range of a predetermined rated voltage according to a power control mode, wherein:
the power control mode includes a first power control mode in which the first battery unit and the second battery unit of the rechargeable battery are separately operated and a second power control mode in which the first battery unit and the second battery unit are operated together,
in the first power control mode, one set of a set of the first switch and the second switch and a set of the second switch and the third switch is turned on, and
in the second power control mode, the first switch and the third switch are turned on.

2. The power control system as claimed in claim 1, further comprising a power converting unit having a voltage conversion ratio determined according to an ON/OFF state of the first switch, the second switch, and the third switch.

3. The power control system as claimed in claim 2, wherein:
a first terminal of the power converting unit is connected to the second terminal of the first link unit, and
a second terminal of the power converting unit is connected to the second terminal of the second link unit.

4. The power control system as claimed in claim 1, further comprising a third link unit, the third link unit being connected between the second terminal of the first link unit and the second terminal of the second link unit.

5. The power control system as claimed in claim 1, wherein the predetermined rated voltage is previously set up according to the power control mode in the control unit.

6. The power control system as claimed in claim 1, wherein:
   each charge and discharge operation of one of the first battery unit and the second battery unit is activated in the first power control mode, and
   the charge and discharge operation of the first battery unit and the second battery unit is activated in the second power control mode.

7. The power control system as claimed in claim 1, wherein the first switch, the second switch, and the third switch are mechanical switches or semiconductor switches.

8. The power control system as claimed in claim 1, wherein the control unit includes:
   a voltage setting unit to set up the predetermined rated voltage;
   a first control unit to confirm a total voltage of the rechargeable battery and generate the switch control signal controlling an ON duty ratio for the voltage of the rechargeable battery to be maintained in the threshold range of the rated voltage;
   a second control unit to confirm each voltage of the first battery unit and the second battery unit, and transmit the voltage to the first control unit; and
   a communicator configured to transmit voltage information or the switch control signal between the first control unit and the second control unit and the outside.

9. The power control system as claimed in claim 8, wherein the first control unit controls the ON duty ratio of the switch control signal to control the charge for the battery unit having a low voltage when the transmitted voltage difference between the first battery unit and the second battery unit is more than a predetermined voltage.

10. The power control system as claimed in claim 8, wherein the second control unit generates the switch control signal controlling the ON duty ratio for the first battery unit and the second battery unit to maintain the voltage within the threshold range for 1/2 of the rated voltage when the first control unit is not operated.

11. The power control system as claimed in claim 1, further comprising a sensing unit, the sensing unit including voltage sensors respectively connected to the first battery unit and the second battery unit to sense a corresponding voltage at a real time or predetermined frequency, the sensing unit to transmit the sensed voltage of the first battery unit and the second battery unit to the control unit.

12. The power control system as claimed in claim 1, wherein the rechargeable battery includes a plurality of lithium ion battery cells.

13. The power control system as claimed in claim 1, wherein voltages of the first battery unit and the second battery unit are the same.

14. A power control method, comprising:
   setting up a power control mode, the power control mode adjusting an operation state for a first battery unit and a second battery unit, the first battery unit and the second battery unit being included in a rechargeable battery, wherein a first terminal of the second battery unit is connected to a first terminal of the first battery unit at a first node;
   setting up each rated voltage of the first battery unit and the second battery unit or an entire rated voltage of the rechargeable battery according to the power control mode;
   generating switch control signals, the switch control signals controlling a first switch connected to a second terminal of the first battery unit, a second switch connected to the first node, and a third switch connected to a second terminal of the second battery unit according to the power control mode; and
   controlling an ON/OFF state of the first switch, the second switch, and the third switch in response to the switch control signals, and charging or discharging the first battery unit and the second battery unit simultaneously or at different times, wherein:
   the power control mode includes a first power control mode in which the first battery unit and the second battery unit of the rechargeable battery are separately operated, and including a second power control mode in which the first battery unit and the second battery unit are operated together,
   in the first power control mode, one set of a set of the first switch and the second switch and a set of the second switch and the third switch is turned on, and
   in the second power control mode, the first switch and the third switch are turned on.

15. The power control method as claimed in claim 14, wherein an ON duty ratio of the switch control signals is controlled for each voltage of the first battery unit and the second battery unit, or the entire voltage of the rechargeable battery, to be maintained within the threshold range of the rated voltage.

16. The power control method as claimed in claim 14, wherein each voltage of the first battery unit and the second battery unit is the same.

17. The power control method as claimed in claim 14, further comprising, before the charge or discharge of the first battery unit and the second battery unit, adjusting a voltage difference between the first battery unit and the second battery unit within a predetermined voltage range.

18. The power control method of claim 17, wherein the adjusting includes:
   measuring each voltage of the first battery unit and the second battery unit; and
   comparing the voltages of the first battery unit and the second battery unit to determine a voltage difference, and controlling the ON duty ratio of the switch control signals transmitted to the switch connected to both terminals of the battery unit to control the charge of the battery unit having a low voltage when the voltage difference is more than a predetermined voltage.

* * * * *